US007075422B2

(12) United States Patent
Nath et al.

(10) Patent No.: US 7,075,422 B2
(45) Date of Patent: Jul. 11, 2006

(54) METHOD FOR INTELLIGENT CRESCENDO SYSTEM

(75) Inventors: Sanjeev Nath, New York, NY (US); Rajesh Patel, Rocky Hill, CT (US)

(73) Assignee: Nattel Group, Inc., New York, NY (US)

( * ) Notice: Subject to any disclaimer, the term of this patent is extended or adjusted under 35 U.S.C. 154(b) by 121 days.

(21) Appl. No.: 10/746,465

(22) Filed: Dec. 24, 2003

(65) Prior Publication Data

US 2005/0146425 A1 Jul. 7, 2005

(51) Int. Cl.
*B60Q 1/00* (2006.01)
*G08B 25/08* (2006.01)

(52) U.S. Cl. ................. 340/457; 340/692; 340/309.16; 340/691.3

(58) Field of Classification Search ................ 340/457, 340/693.3, 309.16
See application file for complete search history.

(56) References Cited

U.S. PATENT DOCUMENTS

| | | | | |
|---|---|---|---|---|
| 5,099,222 | A * | 3/1992 | Campagna | 340/475 |
| 5,414,407 | A * | 5/1995 | Gerrans et al. | 340/475 |
| 5,455,558 | A * | 10/1995 | Gregory | 340/474 |
| 5,620,436 | A | 4/1997 | Lang et al. | 606/4 |
| 5,632,742 | A | 5/1997 | Frey et al. | 606/12 |
| 5,877,676 | A * | 3/1999 | Shankarappa | 340/309.7 |
| 6,179,422 | B1 | 1/2001 | Lai | 351/210 |

OTHER PUBLICATIONS

Iscan, Inc.of Burlington, MA. The Vision Track ISCAN, Inc. website, Jan. 25, 2005.

* cited by examiner

*Primary Examiner*—Donnie L. Crosland
(74) *Attorney, Agent, or Firm*—Kelley Drye & Warren LLP

(57) ABSTRACT

A method and system for warning an operator of a vehicle of a vehicular task that is being performed beyond a pre-determined time for execution of the task involving incrementally increasing audio and visual warnings as the task continues to be performed past the pre-determined time.

8 Claims, 3 Drawing Sheets

METHOD FOR INTELLIGENT CRESCENDO SYSTEM

BACKGROUND

1. Field of Invention

The present invention relates to a device that makes the vehicle operation safe by warning the operator of the vehicle with the help of an incrementally increasing audio/visual warning process. The intelligent crescendo system (ICS) is activated when the operator of a vehicle fails to respond in a defined time frame to an ongoing event which requires manual termination. The ICS includes a crescendo control module, a universal connection module and a switching device to deactivate the ICS in case of a system malfunction.

2. Discussion of Related Art

Timer activated audio warning systems are well known in the automotive industry. The typical on/off settings of a standard audio warning system provides an audio actuation cycle which includes preset time delays between consecutive beeps or other audio warnings. Most timer activated warning systems provide a limited set of settings with each setting having a specific time delay between consecutive audio beeps.

Timer activated audio warning systems provide periodic rather than continuous tones. They are less disturbing to the operator than a continuous tone. It is important to ensure that recurrent beeping is sufficient to keep an operator informed about the task being performed.

Among the problems with these timer controlled audio warning systems is that they require periodic adjustments between the various preset actuation cycles and time delays.

ICS provides a system that warns the operator of a vehicle to manually and/or automatically terminate the execution of a task extending beyond a pre-specified time e.g., there are vehicle operators who activate the turn signals, make the turn and then fail to inactivate the signal if it does not terminate spontaneously. Other vehicle operators in the vicinity may find the non-termination of the activated signal confusing, thus increasing the risk of an accident.

The present invention offers a solution to reduce the confusion created by the inability of the mechanisms provided in the automobile by the manufacturers of the vehicle to intelligently terminate the task at the appropriate time when the event has culminated. The execution signals are analyzed by an analyzer/controller module which calculates the execution time allotted for a specified task. As the execution time of the task exceeds a pre-set time, the volume of the beep starts to rise incrementally. A "continuous" audio tone setting occurs when no action is taken to terminate the task that has exceeded the specified time.

The ICS contains: a) an intelligent controller with memory; b) a display panel; c) a switch; d) a programmable interface unit; and e) a universal connecting module with a graphical interface to the vehicle module.

BRIEF DESCRIPTION OF THE DRAWINGS

The invention claimed herein is described in terms of exemplary embodiments. These exemplary embodiments are described in detail with reference to drawings, which are part of the description of the invention. These embodiments are non-limiting exemplary embodiments, in which like reference numerals represent similar structures throughout the several views of the drawings, and wherein:

DETAILED DESCRIPTION

The invention is further described in detail with reference to the figures, which include the systematic arrangement of the intelligent crescendo system (ICS) with the vehicle main computer control system.

Figure 1:
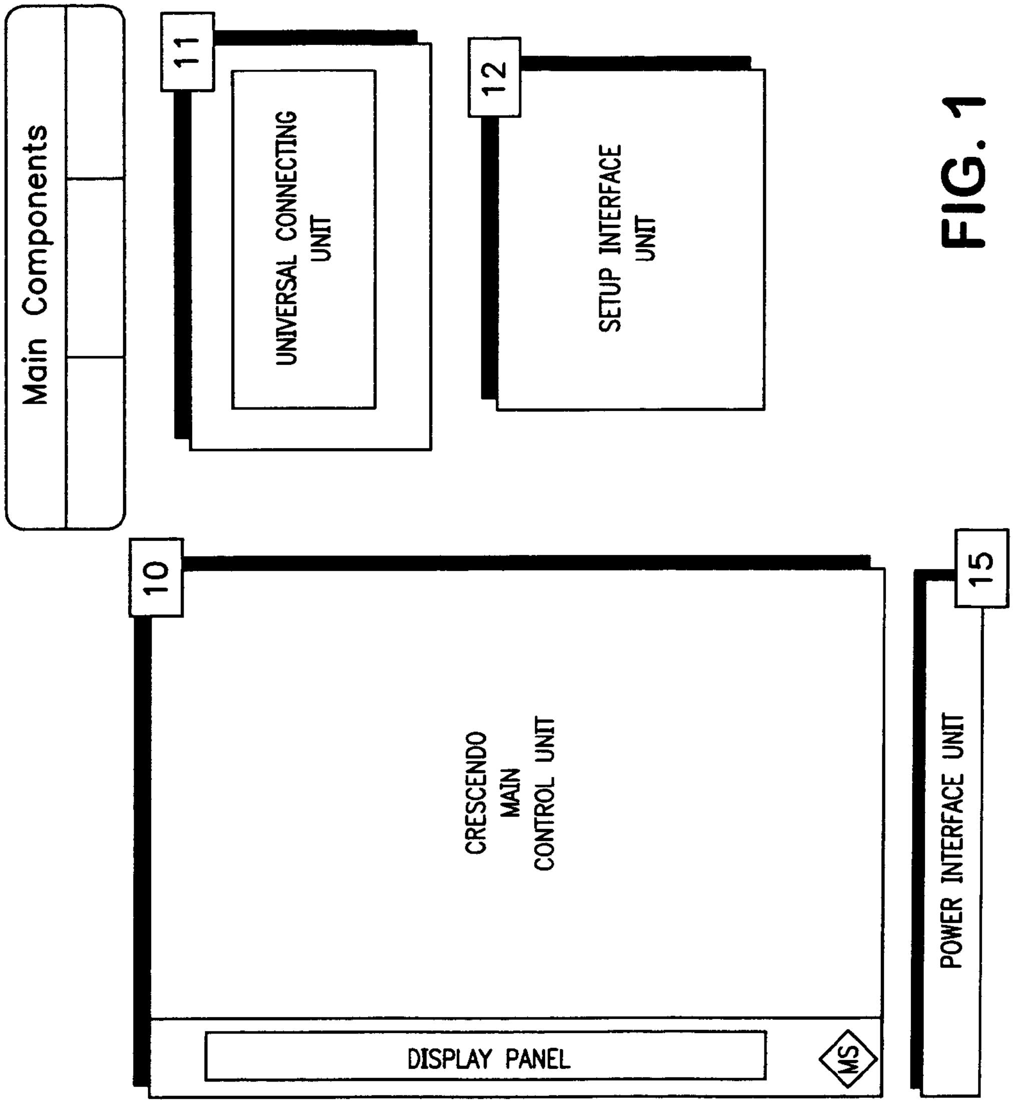
FIG. 1 depicts a exemplary diagram of an ICS, according to at least one embodiment of the present invention.

In one embodiment of the invention, FIG. 1 depicts an exemplary diagram of the main components of an ICS interacting with a vehicle computer system. The ICS of such embodiment comprises: (a) a crescendo main controller 10; (b) a universal connecting module with the vehicle harness 11; (c) a setup interface to program the crescendo main controller 12; (e) a user operated switch 14; and (f) a power supply module interfaced with the vehicle main power supply 15.

The crescendo main control unit 10 of such ICS embodiment may be interfaced with the vehicle main computer control system. The crescendo main control unit 10 illustrated has a display panel 27 and a master ON/OFF switch 26. The crescendo main control unit 10 that is illustrated also has a volume and visual control interface.

A setup interface 12 may be provided to modify the default system settings as required. The setup interface 12 may also provide settings which can be initialized when required. The system may also provide a universal connection module 11 with a graphic connection interface.

Figure 2:
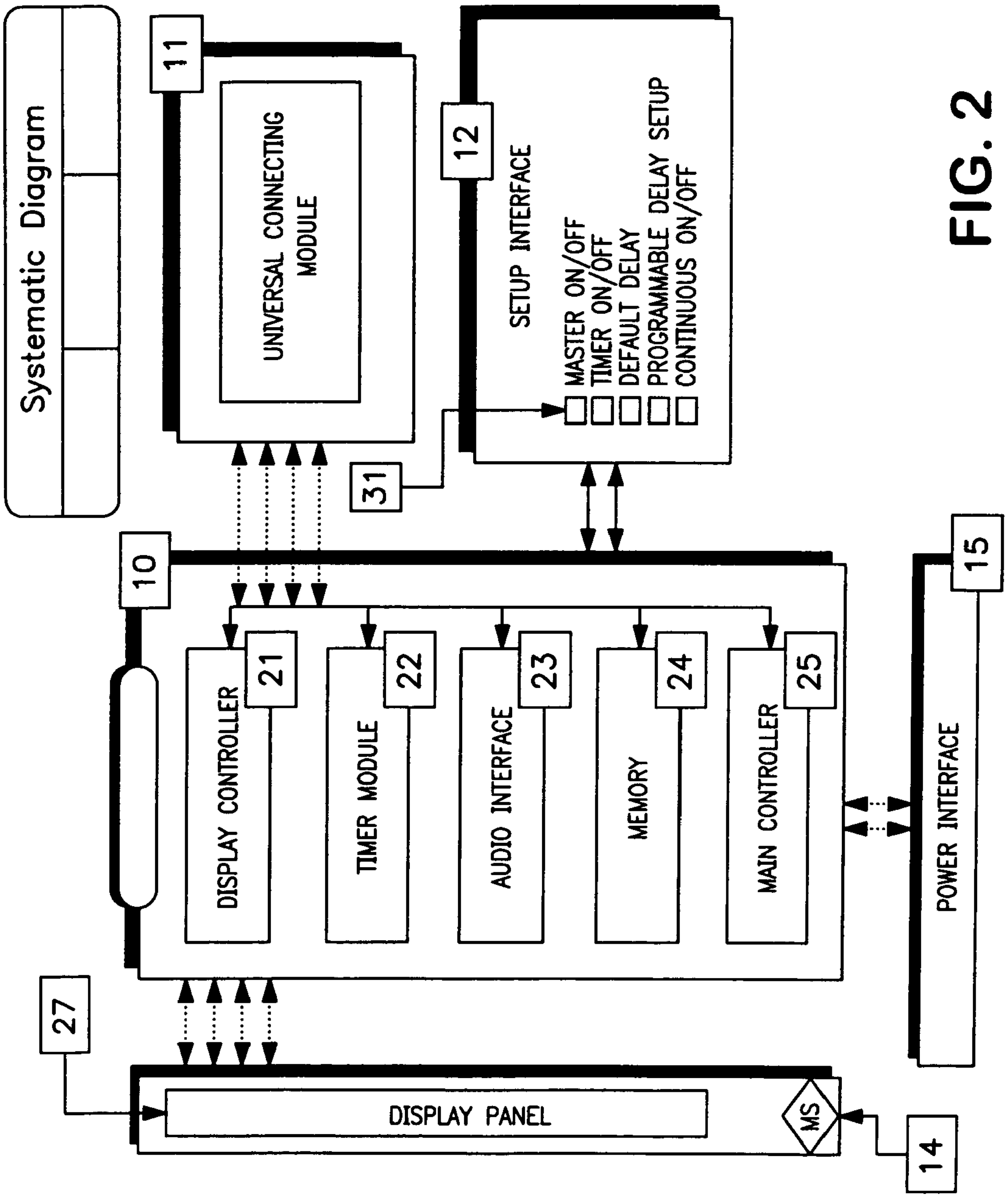
FIG. 2 depicts an exemplary systematic block diagram of ICS, according to a first embodiment of the present invention.

FIG. 2 depicts a systematic diagram of an ICS embodiment. The power to the ICS may be hard wired by conventional power supply available in the vehicle. The power supply adapter regulates and supplies the correct voltage to the controller board and to its sub-modules which can easily be interfaced via a power interface 15. The master control switch 26 is advantageously mounted near the display panel for easy access.

The device has an onboard processing unit which is interconnected to the various sub-components via a system bus. The crescendo main control unit 10 illustrated comprises a main controller 25, a memory module 24, an audio interface 23, a timer module 22, and a display controller 21.

The display panel 27 may perform the task of a message center which is used to view and display the controller settings, and provides an interface to program the unit to display any errors. The crescendo main control unit 10 has a volume and visual control interface.

The optional universal connector module 11 provides a graphic interface with the main module of the vehicle.

A setup interface module 12 is used for programming the crescendo main control unit 10. The setup interface module 12 provides multiple combinations of settings which can facilitate the connection to any type of vehicles. The setup interface module 12 carries a master switch, a timer switch, a default setting switch, a programmable delay setup and an audio as well as visual mode switch.

Figure 3:
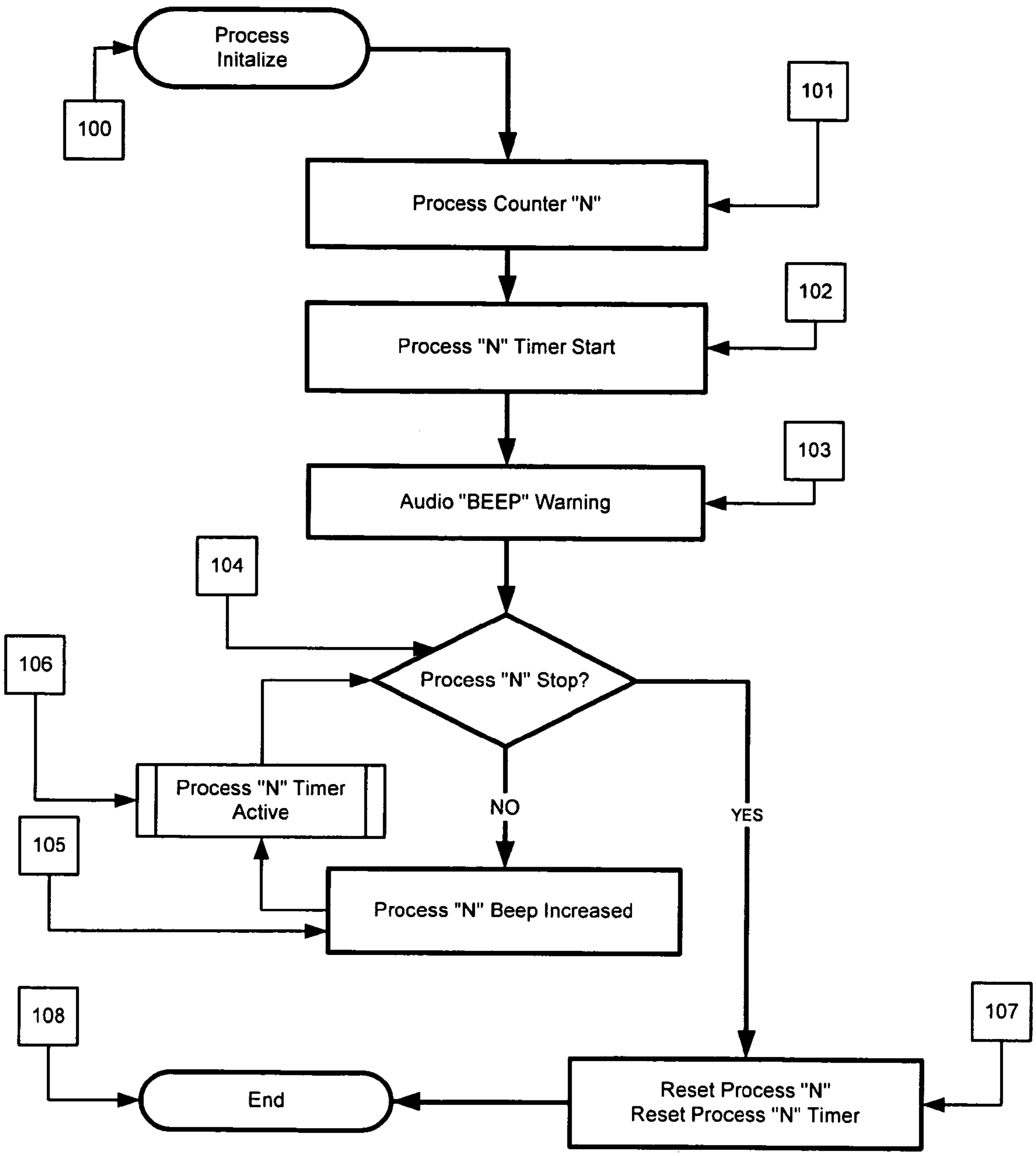
FIG. 3 depicts an exemplary flow diagram of an ICS embodiment defining the steps involved in detecting the active processes and producing the incremental audio warning.

FIG. 3 depicts an exemplary flow diagram of an ICS embodiment defining the steps involved in detecting the active tasks and their total time of execution. All the processes are initialized at the start—step 100. There can be a single process or several processes being executed simultaneously. The process counter defines the total number of processes being executed at any specified time—step 101. The process timer is independently monitoring each individual task being executed—step 102. At the start of each process, the audio warning system is activated—step 103.

The ICS monitors each individual process being executed—step 104. If the monitored task is not terminated within a specified time frame, the crescendo main control unit 10 incrementally increases the audio output and modifies the visual display—step 105. The crescendo main control unit 10 monitors the task and the process execution time—step 106. On the successful termination of the process, the process counter and process timer are initialized or reset to their default value—step 107.

We claim:

1. A method for warning the operator of an apparatus to terminate the execution of a task associated with said apparatus that has extended beyond a pre-determined time frame, said method comprising the steps of:

- monitoring said task to determine if the duration, extent or velocity of its execution exceeds a predetermined time for execution of the task;
- informing the operator of the apparatus by sensible warnings if the task extends beyond said pre-determined time by incrementally raising an intensity of the sensible warning as time further elapses from the pre-determined time; and
- automatically interrupting or terminating said task associated with said apparatus so as to not exceed the pre-determined time limit.

2. The method of claim 1, wherein the apparatus selected is from a group consisting of: a machine, motor, an automobile, a truck, a bus, tractor, crane, or a 2-or 3-wheel conveyance.

3. The method according to claim 1, wherein the task comprises a task selected from the following:

- vehicle operation with continuous activation of the turn signals;
- vehicle operation without seat belt use;
- vehicle operation with continuous activation of hazard signals;
- vehicle operation in reduced light and visibility conditions without appropriate lights activated; and
- vehicle operation in the presence of a malfunction as warned by the onboard computer control system provided by the manufacturer.

4. The method according to claim 1, wherein the sensible warning is an audio signal.

5. The method according to claim 1, wherein the sensible warning is a visual signal.

6. The method according to claim 1, wherein the task comprises an automatically time limited operation of said apparatus so as to avoid exceeding a pre-determined operative limit.

7. The method according to claim 1, wherein the task comprises an automatically time limited operation as controlled by system bus.

8. A device comprising a computer controlled automatic operational shutoff of an apparatus wherein an operator of said apparatus is informed within a pre-determined operational time limit prior to said shutoff by an alarm device generating an increased frequency warning signal of the approaching limit.

* * * * *